UNITED STATES PATENT OFFICE.

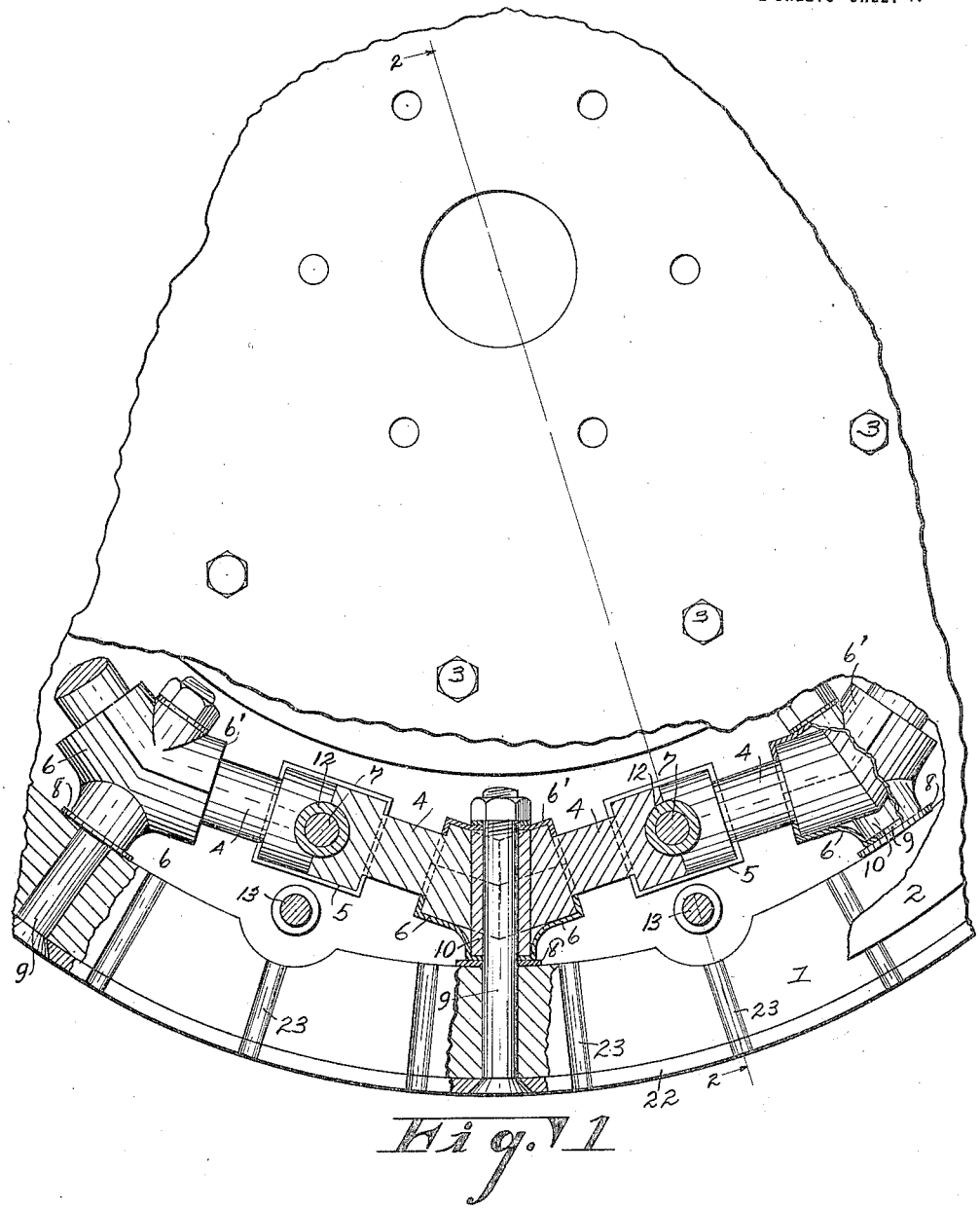

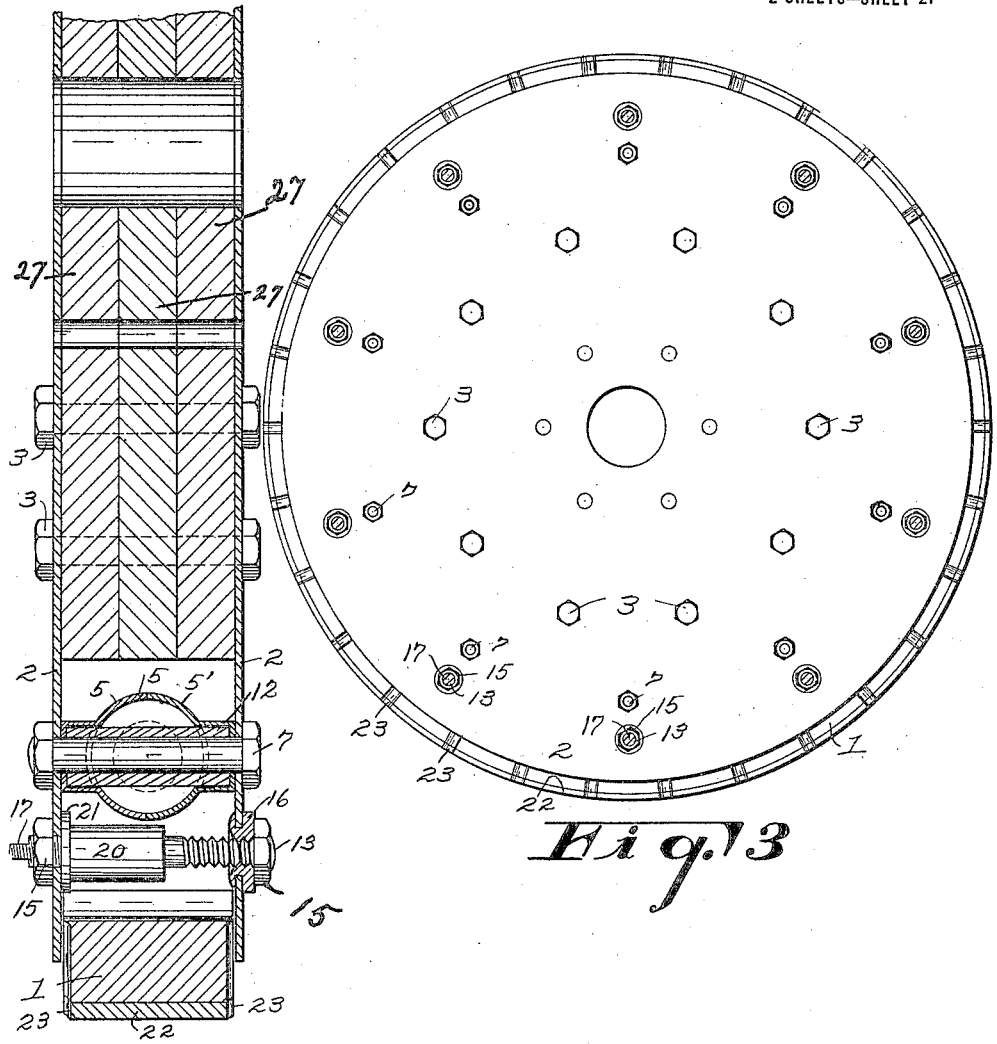

JOHN L. KUNZ, OF MILWAUKEE, WISCONSIN.

AUTOMOBILE-WHEEL.

1,384,902.  Specification of Letters Patent.  Patented July 19, 1921.

Application filed September 16, 1918. Serial No. 254,299.

*To all whom it may concern:*

Be it known that I, JOHN L. KUNZ, a citizen of the United States, residing at Milwaukee, county of Milwaukee, and State of Wisconsin, have invented new and useful Improvements in Automobile-Wheels, of which the following is a specification.

My invention relates to improvements in resilient vehicle wheels.

Numerous attempts have heretofore been made to develop a practical wheel having sufficient resiliency to allow the use of solid tires or non-inflated cushion tires while retaining the advantages derived from the use of inflated rubber tires. But, so far as I am aware the use of metallic springs for this purpose has never been successful under the conditions of long continued use and ordinary road travel, the rapid vibration causing noise, and the severe shocks to which such springs are subjected in all directions, causing crystallization, thus requiring frequent repairs and replacements. Rubber cushioning devices have been used with better results, but many structural difficulties have been encountered, and, as heretofore made, the rubber cushions have been found but little more durable than the springs.

The object of this invention is to provide a form of construction in which the outer rim or felly of the wheel may be supported from a continuous non-metallic resilient ring, preferably composed of rubber connected alternately with the body of the wheel and with the rim at short intervals. Also to provide means whereby such a ring may be formed of a series of short sections, preferably straight, and removably mounted in position under longitudinal compression, the ends abutting those of adjacent sections and being connected either with the rim, (or wheel body), and the central portions being connected with the wheel body, (or rim), my preference being for a connection between the ends of the sections and the rim, and between the central portions and the body.

I have discovered that by using straight sections, with oblique abutting faces in planes radial to the center of the wheel, the rim may be supported from an annular series of apices formed by the sections, the latter lying in chords of the circle which includes such apices. By mounting the rim of the wheel upon these apices, pressure in the direction of the hub not only tends to bend the rod-like sections inwardly, but develops a resultant longitudinal pressure in the sections, which, in case of heavy shock, may be transmitted throughout the entire annular series of sections. The wheel shocks are therefore very effectually distributed, without destructive strains on any portion of the resilient cushioning ring.

I have also discovered that the above described arrangement of the resilient cushioning sections, enables me to secure them in position, in such a manner that no free or independent movements will be permitted within the metal connecting members, and that there will be substantially no tendency to cut or wear the rubber sections or members.

My object may therefore be said to provide a noiseless cushioned wheel, which will distribute and absorb shocks to the maximum extent, and which will have maximum durability, while facilitating such repairs or replacements as may, from time to time, be required.

In the drawings:—

Figure 1 represents a front view of one of the wheels, parts thereof broken away to show the interior.

Fig. 2 is a vertical section of part of the wheel, on line 2—2 of Fig. 1, and

Fig. 3 is a completed front view of one of the wheels.

Like parts are identified by the same reference numerals throughout the several views.

In the construction illustrated, the rim or felly 1 is supported from the hub between a set of side plates or disks 2, which are connected with each other and to the hub by a plurality of bolts 3. The hub and set of disks are herein referred to as the body of the wheel. The rim is resiliently supported between the outer marginal portions of the disks 2, the latter normally embracing the inner portion of the rim to from one-third to one-half of the thickness thereof. The rim is connected with the disks by a resilient non-metallic ring, which is preferably formed of a continuous series of rubber sections 4, which, in the construction shown, are straight, and are thickened in their central and end portions, these thickened portions being connected with the disks and with the rim respectively, by said metallic coupling members or shells 5 and 5', 6 and 6' respectively. The thickened portions of the rubber sections 4 are normally of such size that, when the coupling members are adjusted about them and drawn to coupling position by the connecting bolts, the closed portions of the sections 4 will be compressed, and reduced in diameter to such an extent that they will be rigidly held against relative movement within the coupling members, thus preventing wear.

The end faces of the sections 4 are obliquely faced, and adapted for abutting contact throughout their areas, in planes radial to the center of the wheel, when the sections are properly secured within the coupling members, and the enlargements at the ends of the sections 4 are of such size that longitudinal compression is also required in order to engage them within the coupling members 6, 6', whereby the abutting faces are brought into forcible pressure contact with each other. These faces of the end enlargements are grooved along radial lines to receive the connecting bolts 9, and spacing sleeves 10, the spacing sleeves determining the degree of pressure to be applied to the rubber, instead of depending upon the opposing edges of the pairs of coupling members for this purpose. The coupling members 5 and 5' are also arranged in pairs, and are connected with the side disks by the bolts 7, the coupling members being so disposed that these bolts serve also as clamping bolts to secure the members together, the degree of compression being determined by spacing sleeves 12. The margins of the coupling members 5 and 5', and also of the coupling members 6 and 6', are illustrated in approximate contact. But it will be understood that actual contact is not essential, in view of the fact that the pressure upon the rubber is determined by the spacing sleeves. It will, of course, be understood that the enlarged central portions of the rubber sections 4 are subjected to pressure, not only peripherally, but also at the ends of these enlargements, whereby relative movement of the rubber within the coupling members is prevented, and the spacing sleeves 12 pass through these enlarged central portions of the rubber sections.

It will be observed that the coupling members 5, 5' are divided in the plane of the wheel, i. e., in a plane transverse to the axis of wheel rotation. The coupling members 6, 6' are divided in planes transverse to the wheel, and longitudinal to the meeting sections 4, a partial elbow being formed at the center of the coupling member, as clearly shown in Fig. 1. The outer member 6 has a radially extending cylindrical portion which supports the rim, and through which the bolt 9 passes. A washer 8 is preferably interposed between the end of this cylindrical portion and the rim, and the load is transmitted to the rubber ring through this coupling member.

The inner coupling member 6' is provided with a somewhat similar tubular projection to receive the nut on the inner end of the bolt 9.

The bolt 7 may serve to connect the disks 2, and to bind them to the cylindrical lateral projections on the coupling members 5, 5'. Another series of bolts 13 connect the disks at points between the bolts 7 and the rim. One end of each bolt 13 is reduced and threaded where it passes through the side disk, and this bolt engages a threaded nut 16, having a peripheral groove, in which the margins of the disk aperture fit, the nut being swaged upon said margins, whereby it is held rigidly in position. The enlarged end 20 of the bolt, is provided with a flange 21, adapted to engage the inner face of the opposing disks. Exterior clamping nuts 15 are employed on the respective ends of the bolts, and at the outer side of the wheel the bolt is provided with a flattened, or squared, end 17, whereby it may be rotated by means of a wrench when the nuts 15 are loosened. Therefore the outer margins of the disks may be accurately spaced for movement along the respective sides of the felly 1. The inner portions of the disks are spaced by the circular members or disks 27.

The felly 1 is preferably provided with a series of radial grooves 23, whereby sand and grit may be permitted to escape, and the abrading effect reduced to a minimum. A proper adjustment of the disks 2 into close contact with the felly will, however, substantially eliminate abrasion. The felly may be inclosed by a suitable felly band or tire 22, either metallic or non-metallic, as conditions may require. By removing the outer side plate, the bolts, coupling members and rubber ring, or ring sections, will all be exposed, and any damaged parts may therefore be readily removed and replaced.

While I have referred to the annular series of rubber sections as constituting a ring, it will, of course, be understood that this so-called ring is preferably not a true circle, but that it is made up of a series of short, straight, or comparatively straight, rubber bars, the abutting ends of which form apices, inclosed by the coupling members 6 and 6', and supporting the rim through the medium of said coupling members. Therefore, any movement of any point on the rim, toward the center of the wheel will not only push the ends of the sections 4 inwardly along radial lines, but will increase the pressure, and bring the abutting ends of the sections 4 upon each other, with a corresponding resultant longitudinal pressure and compression of the sections, which pressure and compression will be transmitted, in both directions along the rubber ring, to the opposite side of the wheel, where a corresponding outward bulge will tend to develop. However, the shock of compression will be almost wholly absorbed, and the movement will be so distributed that its effect upon a spring supported vehicle body, particularly when loaded, will be negligible. The parts 27 may serve as a spacer between the two radial disks 2—2.

I claim:

1. A resilient wheel, including the combination with the body portion and rim portion of a resilient, non-metallic ring, secured to the rim at intervals, and to the body between the points of connection with the rim, said ring being composed of an annular series of straight sections, having their ends obliquely faced, and abutted in planes radial to the center of the wheel and the ends of said sections, and means for holding the ends of said sections in abutting pressure contact, and coupling them to the wheel rim in supporting relation thereto.

2. A resilient wheel, including the combination with the body portion and rim portion of an annular series of non-metallic resilient straight members, having oblique end faces in pressure contact with each other, and rigidly coupled to the rim, each section being secured to the wheel body at points intermediate to the points of connection with the rim.

3. A resilient wheel, including the combination with the body portion and rim portion, said body portion including a pair of side disks, partially embracing the rim portion, an annular series of resilient rods each forming the chord of an arc located within the rim, and connected at intervals with the body and rim respectively, said rods being longitudinally compressible, and havig their ends obliquely faced and in abutting pressure contact.

4. A resilient wheel, including the combination with the body portion and rim portion, said body portion including a pair of side disks, partially embracing the rim portion, an annular series of resilient rods, located within the rim, and connected at intervals with the body and rim respectively, said rods being composed of rubber, having their central portions enlarged and coupled to the body and to the disks, and having their end portions enlarged, obliquely faced and abutted and coupled to the rim.

5. A resilient wheel, including the combination with the body portion and rim portion, the body portion including a set of disks, the outer margins of which partially inclose the rim portion, an annular series of resilient non-metallic longitudinally and transversely compressible rods, a set of coupling members rigidly secured to the central portions of said rods, and connected with the disks, and another set of coupling members securing the abutting ends of said rods together, and connecting them with the rim in supporting relation thereto.

6. A resilient wheel, including the combination with the body portion and rim portion, the body portion including a set of disks, the outer margins of which partially inclose the rim portion, an annular series of resilient non-metallic longitudinally and transversely compressible rods, a set of coupling members rigidly secured to the central portions of said rods, and connected with the disks, and another set of coupling members securing the abutting ends of said rods together, and connecting them with the rim in supporting relation thereto, the portions of said rods embraced by said coupling members being enlarged, and said coupling members being clamped thereon into compressing relation to the enlarged portions, whereby the same are rigidly held against relative movement upon the coupling surfaces.

7. A resilient wheel, including the combination with the body portion and rim portion, the body portion including a set of disks, the outer margins of which partially inclose the rim portion, an annular series of resilient non-metallic longitudinally and transversely compressible rods, a set of coupling members rigidly secured to the central portions of said rods, and connected with the disks, and another set of coupling members securing the abutting ends of said rods together, and connecting them with the rim in supporting relation thereto, said coupling members being secured together by clamping bolts which also serve as a means of connection with the disks and rim respectively, and said coupling bolts being provided with spacing sleeves adapted to limit the clamping pressure upon the resilient rods.

8. A resilient wheel, including the combination with the body portion and rim portion, the body portion including a set of disks, the outer margins of which partially inclose the rim portion, an annular series of resilient non-metallic longitudinally and transversely compressible rods, a set of coupling members rigidly secured to the central portions of said rods, and connected with the disks, and another set of coupling members securing the abutting ends of said rods together, and connecting them with the rim in supporting relation thereto, and adjustable means for connecting the outer marginal portions of the disks, whereby they may be held in close proximity to the sides of the rim.

9. A resilient wheel, including the combination with the body portion and rim portion, the body portion including a set of disks, the outer margins of which partially inclose the rim portion, an annular series of resilient non-metallic longitudinally and transversely compressible rods, a set of coupling members rigidly secured to the central portions of said rods, and connected with the disks, and another set of coupling members securing the abutting ends of said rods together, and connecting them with the rim in supporting relation thereto, and adjustable means for connecting the outer marginal portions of the disks, whereby they may be held in close proximity to the sides of the rim, said rim being provided with radially extending grooves.

10. The combination in an automobile wheel, of a pair of radial disks, a plurality of bolts securing said disks to each other and to the center of the wheel, a felly located between said disks near their periphery, a tire surrounding said felly and secured to the latter, a plurality of rubber cushions or blocks secured at their center to said disks, and near their outer ends to said felly, all substantially as and for the purpose specified.

11. The combination in an automobile wheel, of a pair of radial disks, a plurality of bolts securing said disks to each other and to the center of the wheel, a felly located between said disks near their periphery, a tire surrounding said felly and secured to the latter, a plurality of rubber cushions or blocks secured at their center to said disks, and near their outer ends to said felly, an annular series of metallic shells, each formed of two separate parts secured to the inner ends of said rubber blocks or cushions, and an annular series of bolts centrally secured to the inner ends of said rubber blocks or cushions, and at their outer ends to said disks, all substantially as and for the purpose specified.

12. The combination in an automobile wheel, of a pair of radial disks, a plurality of bolts securing said disks to each other and to the center of the wheel, a felly located between said disks near their periphery, a tire surrounding said felly and secured to the latter, a plurality of rubber cushions or blocks secured at their center to said disks, and near their outer ends to said felly, an annular series of metallic shells, each formed of two separate parts secured to the inner ends of said rubber blocks or cushions, an annular series of bolts centrally secured to the inner ends of said rubber blocks or cushions, and at their outer ends to said disks, a second series of metallic shells, each formed of two separate parts secured to the outer ends of said rubber blocks or cushions, and at their opposite ends to said felly, all substantially as and for the purpose specified.

13. The combination in an automobile wheel, of a pair of radial disks, a plurality of bolts securing said disks to each other and to the center of the wheel, a felly located between said disks near their periphery, a tire surrounding said felly and secured to the latter, a plurality of rubber cushions or blocks secured at their center to said disks, and near their outer ends to said felly, an annular series of metallic shells, each formed of two separate parts secured to the inner ends of said rubber blocks or cushions, an annular series of bolts centrally secured to the inner ends of said rubber blocks or cushions, and at their outer ends to said disks, a second series of metallic shells, each formed of two separate parts secured to the outer ends of said rubber blocks or cushions, and at their opposite ends to said felly, and a metallic sleeve surrounding each of said bolts at their inner ends, and preventing contact of said bolts and said rubber cushions or blocks, all substantially as and for the purpose specified.

14. The combination in an automobile wheel, of a pair of radial disks, a plurality of bolts securing said disks to each other, and to the center of the wheel, a felly located between said disks near their periphery, a tire surrounding said felly and secured to the latter, a plurality of rubber cushions or blocks secured at their center to said disks, and near their outer ends to said felly, an annular series of metallic shells, each formed of two separate parts secured to the inner ends of said rubber blocks or cushions, an annular series of bolts centrally secured to the inner ends of said rubber blocks or cushions, and at their outer ends to said disks, a second series of metallic shells, each formed of two separate parts secured to the outer ends of said rubber blocks or cushions, and at their opposite ends to said felly, a metallic sleeve surrounding each of said bolts at their inner ends, and preventing contact of said bolts and said rubber cushions or blocks, a series of transverse bolts supported at their ends from said radial disks, a stationary screw threaded nut upset and secured to one of said disks, whereby the threaded ends of said bolts are increased, a collar on said bolt adapted to bear against the next adjacent radial disks, and a pair of ordinary nuts one secured to each end of said bolt, all substantially as and for the purpose specified.

In testimony whereof I affix my signature in the presence of two witnesses.

JOHN L. KUNZ.

Witnesses:
O. C. WEBER,
A. J. McKERIHAN.